(12) United States Patent
Prechtl et al.

(10) Patent No.: US 6,410,698 B1
(45) Date of Patent: Jun. 25, 2002

(54) REACTIVE DYES WITH A COMBINATION ANCHOR

(75) Inventors: Frank Prechtl, Mannheim; Manfred Patsch, Wachenheim, both of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/622,919

(22) PCT Filed: Feb. 27, 1999

(86) PCT No.: PCT/EP99/01292

§ 371 (c)(1),
(2), (4) Date: Sep. 7, 2000

(87) PCT Pub. No.: WO99/47608

PCT Pub. Date: Sep. 23, 1999

(30) Foreign Application Priority Data

Mar. 13, 1998 (DE) .......................... 198 10 906

(51) Int. Cl.[7] .................... C09B 62/51; C09B 67/22; D06P 1/384
(52) U.S. Cl. .......................... 534/638; 8/549
(58) Field of Search ................. 534/638; 8/549

(56) References Cited

U.S. PATENT DOCUMENTS

| 5,023,326 A | 6/1991 | Tzikas et al. | 534/638 |
| 5,760,194 A | 6/1998 | Lehmann et al. | 534/636 |
| 5,789,557 A | 8/1998 | Dornhagen et al. | 534/634 |

FOREIGN PATENT DOCUMENTS

| DE | 44 34 989 | 4/1996 |
| DE | 196 19 239 | 11/1997 |
| EP | 0 074 928 | 3/1983 |
| EP | 0 369 385 | 5/1990 |
| EP | 0 499 588 | 8/1992 |
| EP | 772 653 | 5/1997 |
| EP | 0 775 730 | 5/1997 |
| JP | 57-199877 | 12/1982 |
| JP | 62-167364 | 7/1987 |
| WO | WO 96/10610 | 4/1996 |

*Primary Examiner*—Flona T. Powers
(74) *Attorney, Agent, or Firm*—Oblon, Spivak, McClelland, Maier & Neustadt, P.C.

(57) ABSTRACT

The reactive dyes have the general formula I

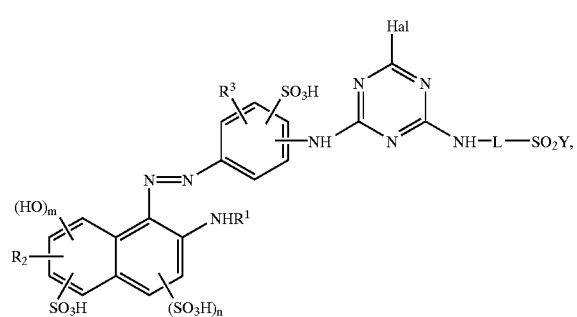

where
  n is 0 or 1,
  m is 0 or 1,
  Y is vinyl or a radical of the formula $C_2H_4Q$, where Q is an alkali-detachable group,
  L is $C_2$–$C_6$-alkylene with or without interruption by 1 or 2 nonadjacent oxygen atoms or 1 or 2 imino groups or is cyclohexylene,
  Hal is fluorine or chlorine,
  $R^1$ is hydrogen or hydroxysulfonylmethyl,
  $R^2$ is hydrogen or hydroxysulfonylmethyl, and
  $R^3$ is carboxyl or hydroxysulfonyl and may also be hydrogen when $R^1$ and/or $R^2$ are each hydroxysulfonylmethyl.

11 Claims, No Drawings

REACTIVE DYES WITH A COMBINATION ANCHOR

The present invention relates to novel red reactive dyes of the general formula I

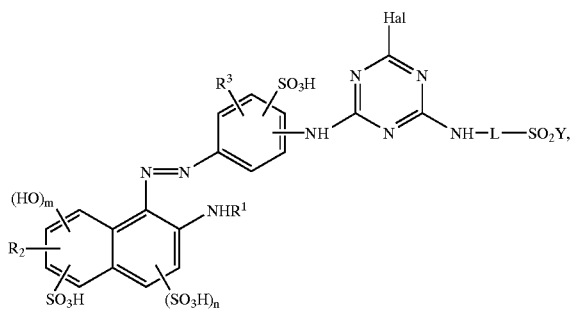

(I)

where
n is 0 or 1,
m is 0 or 1,
Y is vinyl or a radical of the formula $C_2H_4Q$, where Q is an alkali-detachable group,
L is $C_2-C_6$-alkylene with or without interruption by 1 or 2 nonadjacent oxygen atoms or 1 or 2 imino groups or is cyclohexylene,
Hal is fluorine or chlorine,
$R^1$ is hydrogen or hydroxysulfonylmethyl,
$R^2$ is hydrogen or hydroxysulfonylmethyl, and
$R^3$ is carboxyl or hydroxysulfonyl and may also be hydrogen when $R^1$ and/or $R^2$ are each hydroxysulfonylmethyl, their mixtures and their use for dyeing or printing hydroxyl-containing or nitrogenous substrates.

EP-A-074 928 describes similar azo dyes having a sulfato or hydroxyethylsulfonylethylaminochlorotriazineamino radical on the sulfophenyl diazo component.

EP-A-772 653 concerns azo dyes prepared from γ-acid which has been sulfomethylated at the amino group and a diaminobenzenesulfonic acid diazo component in which one of the amino groups is joined through a chlorotriazineamino radical to sulfatoethylsulfonylbenzene.

EP-A-499 588 teaches dyes having a chloroethylsulfonylethylaminochlorotriazine radical on the sulfophenyl diazo component, which was coupled onto γ-acid.

There continues to be a need for red lightfast reactive dyes to fill a large gap in the market. Prior art dyes are unsatisfactory with regard to their application properties, especially their lightfastnesses.

It is an object of the present invention to provide red dyes having an advantageous property profile, especially good wet- and lightfastnesses.

We have found that this object is achieved by the reactive dyes of the formula I defined at the beginning, their mixtures and their use for dyeing or printing hydroxyl-containing or nitrogenous substrates.

The novel reactive dyes of the formula I are each indicated in the form of the free acid. It will be appreciated that their salts are encompassed by the invention, too.

Suitable cations are derived from metal or ammonium ions. Metal ions are especially lithium, sodium or potassium ions. Ammonium ions for the purposes of the present invention are substituted or unsubstituted ammonium cations. Examples of substituted ammonium cations are monoalkyl-, dialkyl, trialkyl-, tetraalkyl- or benzyltrialkyl-ammonium cations or those cations derived from nitrogenous five- or six-membered saturated heterocycles, such as pyrrolidinium, piperidinium, morpholinium, piperazinium or N-alkylpiperazinium cations or their N-monoalkyl- or N,N-dialkylsubstituted products. Alkyl is generally straight-chain or branched $C_1-C_{20}$-alkyl, which may be substituted by 1 or 2 hydroxyl groups and/or interrupted by from 1 to 4 oxygen atoms in ether function.

In general, all alkyl, alkenyl and alkylene groups mentioned above and appearing in the formulae hereinbelow may be straight-chain or branched.

Q is for example chlorine, bromine, $C_1-C_4$-alkylsulfonyl, phenylsulfonyl, $OSO_3H$, $SSO_3H$, $OP(O)(OH)_2$, $C_1-C_4$-alkylsulfonyloxy, phenylsulfonyloxy, $C_1-C_4$-alkanoyloxy, $C_1-C_4$-dialkylamino or a radical of the formula

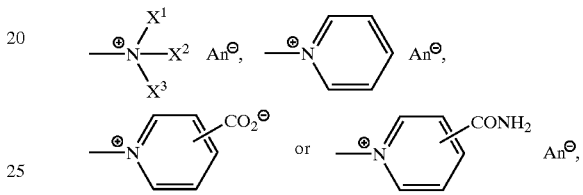

where $X^1$, $X^2$ and $X^3$ are identical or different and are each independently of the others $C_1-C_4$-alkyl or benzyl and An⊖ is in each case one equivalent of an anion. Suitable anions include for example fluoride, chloride, bromide, iodide, mono-, di- or trichloroacetate, methanesulfonate, benzenesulfonate or 2- or 4-methylbenzenesulfonate.

L is for example $(CH_2)_2$, $(CH_2)_3$, $(CH_2)_4$, $CH(CH_3)CH_2$, $CH(CH_3)CH(CH_3)$, $(CH_2)_5$, $(CH_2)_6$, $(CH_2)_2O(CH_2)_2$, $(CH_2)_3O(CH_2)_2$, $(CH_2)_2O(CH_2)_2O(CH_2)_2$, $(CH_2)_2NH(CH_2)_2$, $(CH_2)_3NH(CH_2)_2$ or $(CH_2)_2NH(CH_2)_2NH(CH_2)_2$.

Aromatic diamines useful as diazo component and also attachment site to the cyanuric halide include for example 2,4-diaminobenzenesulfonic acid, 2,5-diaminobenzenesulfonic acid, 4,6-diaminobenzene-1,3-disulfonic acid and 2,5-diaminobenzene-1,4-disulfonic acid.

Suitable coupling components include for example the aminonaphthalenesulfonic acids 2-naphthylamine-3,6-disulfonic acid, 2-naphthylamine-5,7-disulfonic acid, 2-naphthylamine-6,8-disulfonic acid, 2-hydroxysulfonylmethylaminonaphthalene-5-sulfonic acid or 2-hydroxysulfonylmethylaminonaphthalene-6-sulfonic acid.

Suitable coupling components further include aminonaphtholsulfonic acids such as 2-amino-5-hydroxynaphthalene-7-sulfonic acid, 2-amino-8-hydroxynaphthalene-6-sulfonic acid, 2-amino-8-hydroxynaphthalene-3,6-disulfonic acid, 2-amino-5-hydroxynaphthalene-1,7-disulfonic acid, 2-amino-7-hydroxysulfonylmethyl-8-hydroxynaphthalene-6-sulfonic acid, 2-hydroxysulfonylmethylamino-8-hydroxynaphthalene-6-sulfonic acid, 2-hydroxysulfonylmethylamino-7-hydroxysulfonyl-methyl-8-hydroxynaphthalene-6-sulfonic acid.

Preference is given to reactive dyes of the formula I wherein $R^3$ is carboxyl or preferably hydroxysulfonyl.

Preference is also given to reactive dyes of the formula I wherein $R^1$ is hydrogen.

Preference is further given to reactive dyes of the formula I wherein $R^3$ is hydrogen and $R^1$ is hydroxysulfonylmethyl.

Preference is moreover given to reactive dyes of the formula I where Y is vinyl or 2-sulfatoethyl, 2-thiosulfatoethyl, 2-chloroethyl or acetoxyethyl in the fiber-reactive radical —SO$_2$Y.

Reactive dyes containing coupling components of the general formula II a–d

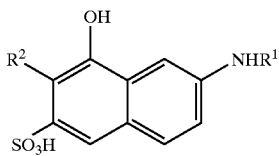
(IIa)

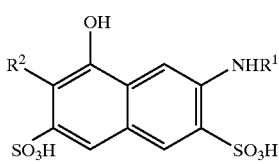
(IIb)

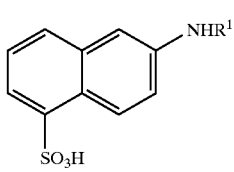
(IIc)

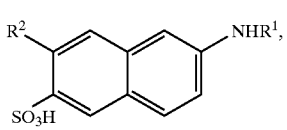
(IId)

where R$^1$ and R$^2$ are each as defined above, are also preferred.

Preference is given especially to dyes of the general formula III

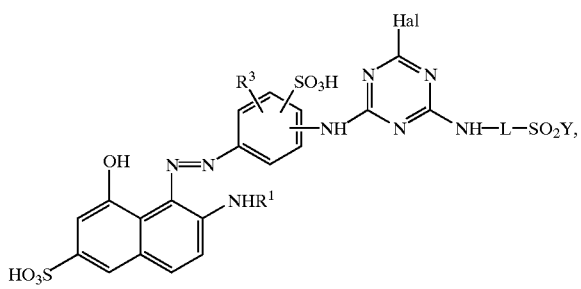
(III)

where R$^1$, R$^3$, Hal, L and Y are each as defined above.

Preference is further given to reactive dyes of the formula I where L is ethylene.

Preference is given particularly to dyes of the general formula I and III and also to those containing coupling components of the formula IIa–d, wherein R$^1$ is hydroxysulfonylmethyl.

Preference is also given to reactive dyes wherein the hydroxysulfonyl group in the phenyl ring is ortho to the diazo group.

The novel reactive dyes of the general formula I are obtainable in a conventional manner.

For example, a phenylenediamine of the formula

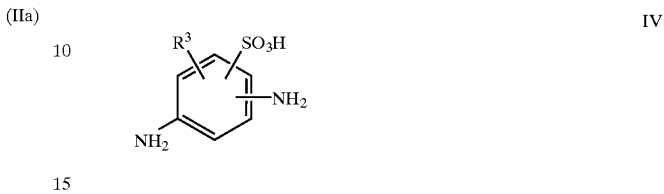
(IV)

where R$^3$ is as defined above, can be reacted with a trihalotriazine to form compounds of the formula

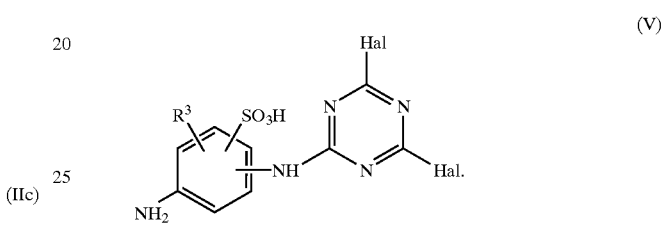
(V)

These amines of the formula V are conventionally diazotized and acid-coupled onto coupling components of the formula II

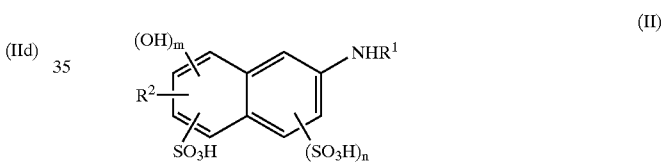
(II)

where R$^1$, R$^2$, m and n are each as defined above. The resulting azo dye is reacted with an amine of the formula

H$_2$N—L—SO$_2$Y    (VI), in aqueous solution at pH 5–6 to obtain the dyes of the invention.

The order of the elementary reactions is discretionary. Thus, in a further process variant, the halogen in the amine of the formula V is first replaced by the amine of the formula VI, prior to diazotization and coupling onto the naphthalenesulfonic acid of the formula II.

Hydroxysulfonyl-substituted naphthalenesulfonic acids are obtained in a conventional manner by reaction with hydroxymethanesulfonic acid.

The present invention further provides mixtures of the dyes of the formula I with from 0.1 to 30 parts by weight of one or more red, orange, yellow or blue dyes based on 100 parts by weight of reactive dye I.

Suitable yellow reactive dyes are described in U.S. Pat. No 5,182,371 for example. Further suitable dyes include: C.I. Reactive Yellow 145, C.I. Reactive Yellow 168 or C.I. Reactive Yellow 176.

Suitable orange reactive dyes conform for example to the formula

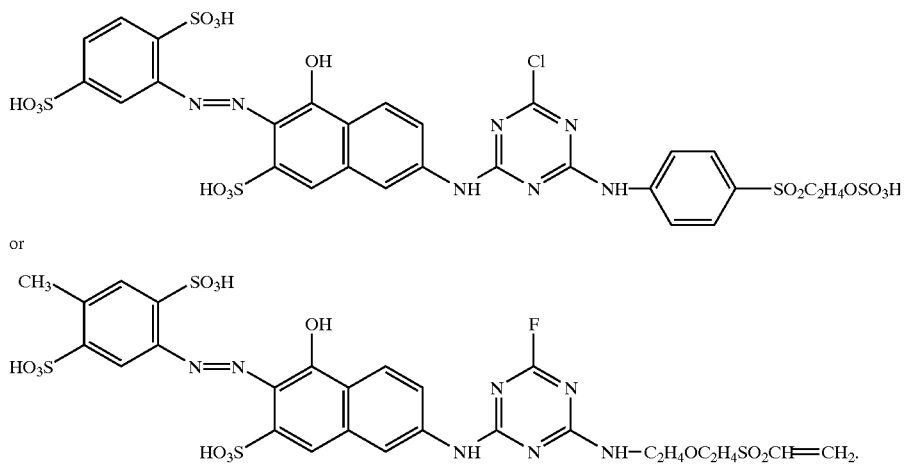

or

Further suitable dyes include: C.I. Reactive Orange 7 (17 756), C.I. Reactive Orange 15, C.I. Reactive Orange 16 (17 757), C.I. Reactive Orange 56, C.I. Reactive Orange 57, C.I. Reactive Orange 72 (17 754), C.I. Reactive Orange 74, C.I. Reactive Orange 82, C.I. Reactive Orange 83 or C.I. Reactive Orange 90.

Suitable red reactive dyes are described in U.S. Pat. No. 5,200,511, for example. Further suitable dyes include: C.I. Reactive Red 35, C.I. Reactive Red 103, C.I. Reactive Red 113, C.I. Reactive Red 180, C.I. Reactive Red 194, C.I. Reactive Red 195, C.I. Reactive Red 198, C.I. Reactive Red 222, C.I. Reactive Red 223, C.I. Reactive Red 227, C.I. Reactive Red 228 or C.I. Reactive Red 239.

Suitable dyes conform especially to the formula VII $$[D{-\!\!\!=}N{=\!\!\!=}N{-\!\!\!=}K{-\!\!\!=}]_v Z, \quad (VII)$$

where v is 1 or 2,

K is a radical of the formula

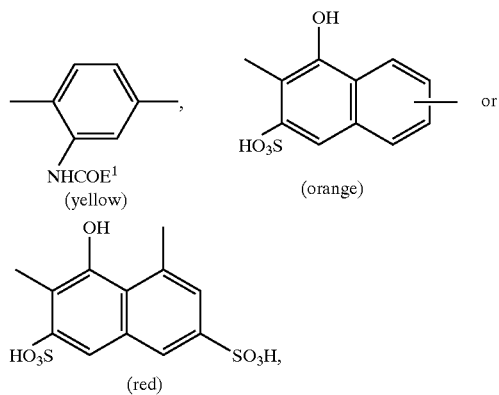

wherein the left-hand side bonding dash represents in each case the bond to the azo bridge, $E^1$ is $C_1$–$C_4$-alkyl, with or without hydroxyl substitution, phenyl, amino or a radical of the formula $$NH{-}L^1{-}SO_2{-}C_2H_4{-}Q,$$

D is a benzene or naphthalene radical which in either case may bear a fiber-reactive radical and may be substituted by from one to three substituents selected from the group consisting of $C_1$–$C_4$-alkyl, $C_1$–$C_4$-alkoxy, hydroxyl and hydroxysulfonyl, and z is $C_1$–$C_4$-alkanoylamino with or without carboxyl substitution, benzoylamino or a radical of the formula

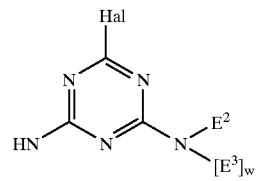

where w is 0 or 1,

Hal is fluorine or chlorine, $E^2$ is hydrogen or $C_1$–$C_4$-alkyl with or without interruption by an oxygen atom in ether function and with or without hydroxyl substitutution, and $E^3$ is hydroxysulfonyl-monosubstituted or -disubstituted phenyl or a radical of the formula

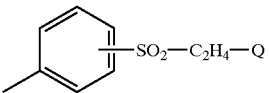

or $$L^1{-}SO_2{-}C_2H_4{-}Q,$$

where Q is in each case as defined above and $L^1$ is in each case $C_2$–$C_4$-alkylene which may be interrupted by 1 oxygen atom in ether function.

Suitable blue reactive dyes include for example C.I. Reactive Blue 171, C.I. Reactive Blue 160, C.I. Reactive Blue 191, C.I. Reactive Blue 198, C.I. Reactive Blue 211, C.I. Reactive Blue 71 or Reactive Black 5.

The individual dyes of the novel dye mixtures are known and are obtainable by methods of synthesis familiar to those skilled in the art. Some—Reactive Black 5, for example—are commercially available. The novel dye mixtures are obtainable by mechanical mixing of the individual components.

The novel reactive dyes of the formula I and their mixtures according to the invention are advantageously useful for dyeing or printing hydroxyl-containing or nitrogenous organic substrates. Such substrates include for example leather or fiber material comprising predominantly natural or synthetic polyamides or natural or regenerated cellulose. The dyes and their mixtures are further useful for printing paper and textiles with inkjet inks. In the inks, the dye is present in aqueous solution, optionally in a mixture with water-soluble organic solvents. The dyes of the present invention are also useful for dyeing keratinous fibers, for example in hair dyeing or the dyeing of furs. The novel dyes are preferably useful for dyeing and printing textile material based on wool or especially cotton.

Substrates based on cellulose in particular are dyed with a very high yield of fixation in strong dyeings having very good lightfastness and also excellent wetfastnesses, such as wash, chlorinated bleach, peroxide bleach, alkali, seawater or perspiration fastness.

The Examples hereinbelow illustrate the invention.

EXAMPLE 1

40.3 g of cyanuric chloride were dissolved in 250 ml of acetone and added to 250 ml of ice-water and 0.2 g of a wetting agent. To this was added, at 0–5° C., 60.1 g of 4,6-diaminobenzene 1,3-disulfonic acid, and a pH of 4–6 was set with sodium bicarbonate. After the reaction had ended, the batch was clarified, and the filtrate was admixed with 100 ml of hydrochloric acid (30% by weight strength) and, at 0–5° C., with 63 ml of 23% strength by weight sodium nitrite solution added a little at a time. The slight nitrite excess was destroyed by addition of a little amidosulfuric acid.

To this reaction mixture were added 50.2 g of 2-amino-8-hydroxynaphthalene-6-sulfonic acid, a pH of 2–3 was set with sodium bicarbonate, and the batch was slowly allowed to warm to 20° C. Once diazo compound was no longer detectable, the pH was raised to 5–6 with sodium bicarbonate, the reaction mixture was clarified and the dye was precipitated by addition of 200 g of sodium chloride and filtered off with suction.

77.0 g of this moist paste were suspended in 400 ml of water, admixed with a sulfuric acid solution of 17.5 g of 2-(β-sulfatoethylsulfonyl)ethylamine in 450 ml of water and brought to pH 5–6 with sodium bicarbonate. Once dichloro dye was no longer detectable, the dye was precipitated by addition of 350 g of sodium chloride, filtered off with suction and dried at 40° C. under reduced pressure to leave a readily water-soluble reddish powder of the dye of the formula

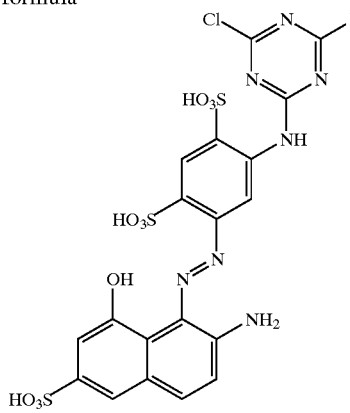

which exhibits good light- and wetfastnesses on cotton.

Example 1 was repeated using the phenylenediamines and coupling components recited in Table 1 to prepare the following compounds:

TABLE 1

| Ex. | Phenylenediamine | Coupling component | Hue |
|---|---|---|---|
| 2 | 2,4-Diamino-benzenesulfonic acid | 2-Hydroxysulfonylmethyl-amino-8-hydroxynaphthalene-6-sulfonic acid | Bluish red |
| 3 | 2,4-Diamino-benzenesulfonic acid | 2-Hydroxysulfonylmethyl-amino-8-hydroxynaphthalene-3,6-disulfonic acid | Bluish red |
| 4 | 2,4-Diamino-benzenesulfonic acid | 2-Hydroxysulfonylmethyl-aminonaphthalene-6-sulfonic acid | Scarlet |
| 5 | 2,5-Diamino-benzenesulfonic acid | 2-Hydroxysulfonylmethyl-amino-8-hydroxynaphthalene-6-sulfonic acid | Bluish red |
| 6 | 2,4-Diamino-benzenesulfonic acid | 2-Hydroxysulfonylmethyl-amino-8-hydroxynaphthalene-3,6-disulfonic acid | Bluish red |
| 7 | 2,4-Diamino-benzenesulfonic acid | 2-Hydroxysulfonylmethyl-aminonaphthalene-6-sulfonic acid | Scarlet |

EXAMPLE 8 a) 168.5 g of the phenylenediamine 4,6-diaminobenzene-1,3-disulfonic acid were suspended in 500 ml of ice-water at pH 2 and admixed with 0.4 g of a wetting agent. To this was added at 0–5° C. a solution of 116 g of cyanuric chloride in 600 ml of acetone, and a pH of 2–4 was maintained by addition of sodium bicarbonate.

To this was added 154 g of a sulfuric acid paste of 2-(β-sulfatoethylsulfonyl)ethylamine, which was followed by stirring at 30° C. and pH 5–6 until dichlorotriazine compound was no longer detectable. The product of the formula

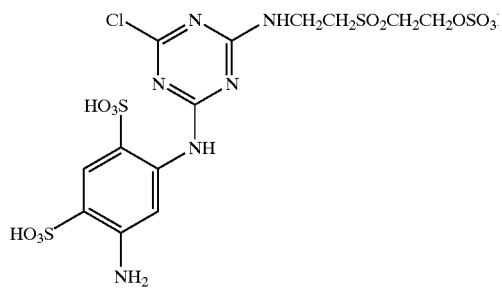

was precipitated at pH 0.5–1 by addition of 600 g of sodium chloride, filtered off with suction and dried under reduced pressure.

b) 37 g of the compound prepared under a) were suspended in 1400 ml of ice-water, 400 ml of acetone and 25 ml of hydrochloric acid (30% strength by weight) and admixed with 15 ml of 23% strength by weight sodium nitrite solution added a little at a time. The slight nitrite excess was decomposed with a little amidosulfuric acid. 25.9 g of 2-amino-8-hydroxy-3,6-disulfonic acid were added 0–5° C., the pH was maintained at 2–3 with sodium acetate, and the reaction mixture was gradually allowed to warm to 20° C. The reaction mixture was adjusted to pH 5 with sodium bicarbonate and clarified, and the dye was precipitated by addition of 300 g of sodium chloride. Drying under reduced pressure yielded the dye of the formula

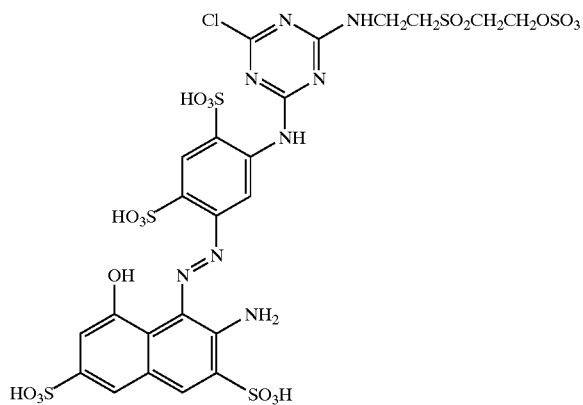

in the form of a readily water-soluble reddish powder.

Example 8 was repeated using the phenylenediamines and the coupling components recited in Table 2 to prepare the following compounds:

TABLE 2

| Ex. | Phenylenediamine | Coupling component | Hue |
|---|---|---|---|
| 9 | 4,6-Diaminobenzene-1,3-disulfonic acid | 2-Naphthylamine-6-sulfonic acid | Scarlet |
| 10 | 4,6-Diaminobenzene-1,3-disulfonic acid | 2-Naphthylamine-5-sulfonic acid | Scarlet |
| 11 | 4,6-Diaminobenzene-1,3-disulfonic acid | 2-Hydroxysulfonylmethyl-amino-8-hydroxynaphthalene-6-sulfonic acid | Bluish red |
| 12 | 4,6-Diaminobenzene-1,3-disulfonic acid | 2-Hydroxysulfonylmethyl-amino-8-hydroxynaphthalene-3,6-disulfonic acid | Bluish red |
| 13 | 4,6-Diaminobenzene-1,3-disulfonic acid | 2-Hydroxysulfonylmethyl-aminonaphthalene-6-sulfonic acid | Scarlet |
| 14 | 4,6-Diaminobenzene-1,3-disulfonic acid | 7-Hydroxysulfonylmethyl-2-amino-8-hydroxy-naphthalene-6-sulfonic acid | Bluish red |
| 15 | 2,5-Diaminobenzene-1,4-disulfonic acid | 2-Naphthylamine-6-sulfonic acid | Red |
| 16 | 2,5-Diaminobenzene-1,4-disulfonic acid | 2-Naphthylamine-5-sulfonic acid | Red |
| 17 | 2,5-Diaminobenzene-1,4-disulfonic acid | 2-Hydroxysulfonylmethyl-amino-8-hydroxynaphthalene-6-sulfonic acid | Bluish red |
| 18 | 2,5-Diaminobenzene-1,4-disulfonic acid | 2-Hydroxysulfonylmethyl-amino-8-hydroxynaphthalene-3,6-disulfonic acid | Bluish red |
| 29 | 2,5-Diaminobenzene-1,4-disulfonic acid | 2-Hydroxysulfonylmethyl-aminonaphthalene-6-sulfonic acid | Scarlet |

We claim:

1. A reactive dye of the general formula I

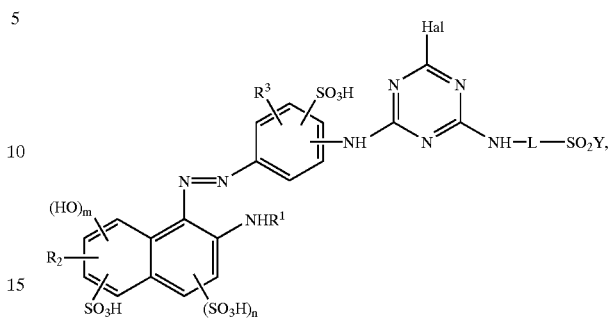

where
n is 0 or 1,
m is 0 or 1,
Y is vinyl or a radical of the formula $C_2H_4Q$, where Q is an alkali-detachable group,
L is $C_2-C_6$-alkylene with or without interruption by 1 or 2 nonadjacent oxygen atoms or 1 or 2 imino groups or is cyclohexylene,
Hal is fluorine or chlorine,
$R^1$ is hydrogen or hydroxysulfonylmethyl,
$R^2$ is hydrogen or hydroxysulfonylmethyl, and
$R^3$ is carboxyl or hydroxysulfonyl and may also be hydrogen when $R^1$ and/or $R^2$ are each hydroxysulfonylmethyl.

2. A reactive dye as claimed in claim 1, wherein $R^3$ is carboxyl or hydroxysulfonyl.

3. A reactive dye as claimed in claim 1, wherein $R^3$ is hydroxysulfonyl.

4. A reactive dye as claimed in claim 1, wherein $R^1$ is hydroxysulfonylmethyl.

5. A reactive dye as claimed in claim 1, wherein $R^3$ is hydrogen and $R^1$ is hydroxysulfonylmethyl.

6. A reactive dye as claimed in claim 1, wherein Y is vinyl or a radical of the formula $C_2H_4OSO_3H$, $—C_2H_4SSO_3H$, $—C_2H_4Cl$ or $C_2H_4OCOCH_3$.

7. A reactive dye as claimed in claim 1, of the general formula III

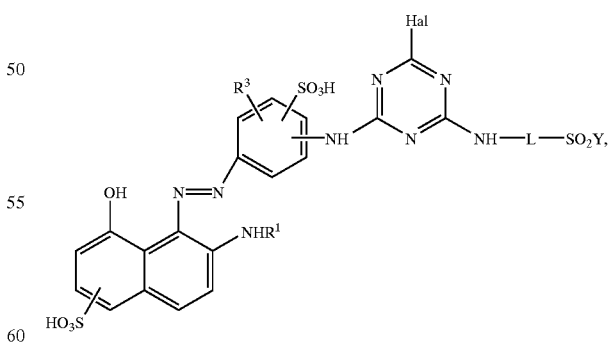

where $R^1$, $R^3$, Hal, L and Y are each as defined in claim 1.

8. A reactive dye as claimed in claim 1, wherein the hydroxysulfonyl group in the phenyl ring is ortho to the diazo group.

9. A mixture comprising a reactive dye as claimed in claim 1 and also from 0.1 to 30 parts by weight of a red, orange, yellow or blue reactive dye based on 100 parts by weight of reactive dye I.

10. A method of dyeing or printing hydroxyl-containing or nitrogenous substrates comprising applying thereto a reactive dye of claim 1 or a mixture thereof.

11. Hydroxyl-containing or nitrogenous substrates which have been dyed or printed with a reactive dye as claimed in claim 1 or with mixtures thereof.

* * * * *